United States Patent
Epstein et al.

(10) Patent No.: US 7,074,016 B1
(45) Date of Patent: Jul. 11, 2006

(54) PLANAR TURBOPUMP ASSEMBLY

(75) Inventors: Alan H. Epstein, Lexington, MA (US); Antoine Deux, Falls Church, VA (US); Yoav P. Peles, Rensselaer, NY (US); Laurent Jamonet, Aix-en-Provence (FR)

(73) Assignee: Massachusetts Institute of Technology, Cambridge, MA (US)

( * ) Notice: Subject to any disclaimer, the term of this patent is extended or adjusted under 35 U.S.C. 154(b) by 338 days.

(21) Appl. No.: 10/445,249

(22) Filed: May 23, 2003

Related U.S. Application Data (60) Provisional application No. 60/382,920, filed on May 24, 2002.

(51) Int. Cl.
*F01D 1/06* (2006.01)
*F04B 17/00* (2006.01)
(52) U.S. Cl. ............... 417/348; 417/406; 415/84
(58) Field of Classification Search ............ 417/406, 417/409, 348, 355, 390, 392; 60/259; 415/71, 415/83, 84, 91
See application file for complete search history.

(56) References Cited

U.S. PATENT DOCUMENTS

| | | | | |
|---|---|---|---|---|
| 2,230,545 A | * | 2/1941 | Root | 415/83 |
| 2,836,123 A | * | 5/1958 | Banerian | 417/348 |
| 3,116,908 A | * | 1/1964 | Wosika | 415/143 |
| 3,212,265 A | * | 10/1965 | Neuber | 60/361 |
| 3,813,191 A | * | 5/1974 | Foster | 417/406 |
| 5,176,509 A | * | 1/1993 | Schmider et al. | 417/423.7 |
| 5,932,940 A | * | 8/1999 | Epstein et al. | 310/40 MM |
| 6,082,975 A | * | 7/2000 | Lahens | 417/406 |

FOREIGN PATENT DOCUMENTS

DE   32 23 868 A1 * 12/1983

OTHER PUBLICATIONS

Deux, "Design of a silicon microfabricated rocket engine turbopump," S.M. Thesis, Massachusetts Institute of Technology, Cambridge, MA, 2001.
Jamonet, "Testing of a microrocket engine turbopump," S.M. Thesis, Massachusetts Institute of Technology, Cambridge, MA, 2002.
Diez, "Preliminary performance characteristics of a microfabricated turbopump," S.M. Thesis, Massachusetts Institute of Technology, Cambridge, MA, 2003.

* cited by examiner

*Primary Examiner*—Charles G. Freay
(74) *Attorney, Agent, or Firm*—Theresa A. Lober (57) ABSTRACT

A turbopump including a rotor having a first face and a second face and being characterized by a rotor axial height between the first and second rotor faces and by a rotor diameter. A rotor housing includes bearing surfaces for supporting rotation of the rotor, includes turbine inlet and turbine outlet ports and pump inlet and pump outlet ports, and includes pump and turbine fluid sealing surfaces. A plurality of turbine blades of a turbine blade axial height, and a plurality of pump blades of a pump blade axial height, are disposed on a face of the rotor. The turbine blades and pump blades can be together disposed on the rotor first face. Further or alternatively, a turbopump axial height including rotor bearings, turbine blade and pump blade axial height, and rotor axial height, can be less than rotor diameter.

47 Claims, 7 Drawing Sheets

PLANAR TURBOPUMP ASSEMBLY

This application claims the benefit of U.S. Provisional Application No. 60/382,920, filed May 24, 2002, the entirety of which is hereby incorporated by reference.

STATEMENT REGARDING FEDERALLY SPONSORED RESEARCH

This invention was made with Government support under Contract No. DABT63-00-1-0001, awarded by DARPA. The Government has certain rights in the invention.

BACKGROUND OF INVENTION

This invention relates to turbomachine design, and more specifically relates to the design of turbopumps.

Turbopumps have been employed for a wide range of applications, e.g., where it is required to pressurize and pump a fluid or gas from a supply source to be employed at an application destination. For example, turbopumps are commonly employed for pressurizing rocket engine fuel to be delivered to a rocket engine combustion chamber.

In a conventional turbopump configuration, there is in general provided a pump or compressor stage that is coupled to a turbine stage for providing power to the pump stage. Typically the pump and turbine stages are coupled in a configuration that enables efficient delivery of power from the turbine to the pump stage. For example, turbopump and turbine stages are commonly coupled through a common rotatable shaft or other transmission feature. Conventionally, the turbine stage is provided with a turbine rotor that is connected to the rotatable shaft or other power transmission feature, and the pump stage typically includes a rotational pumping system such as a pump rotor. When a fluid is directed to the turbine rotor, the turbine rotor rotates, causing the shaft to correspondingly rotate, and producing torque that is translated, via the shaft, into rotational pumping at the pump stage. A fluid provided to the pump stage is correspondingly pumped, and possibly pressurized, by the pump rotor, for delivery to the intended application. For purposes of this description, the term fluid is herein meant to refer to gases, liquids, and supercritical fluids Although this conventional turbopump configuration has been found to be convenient for a wide range of macro-scale applications, it is not found to effectively enable many meso-scale and micro-scale applications that are becoming increasingly important and widely desired. Compact and highly mobile meso- and micro-scale thermodynamic and energy systems are important for applications such as powering and cooling of portable electronics, communications, and medical devices, control and modular propulsion of distributed and self-powered actuation and sensor systems, and thermodynamic cycling of distributed and/or auxiliary heating and ventilation systems, as well as many other applications. Typically, such applications optimally employ power sources and corresponding componentry that are characterized by high power and energy density but minimal size and weight, and that are cost effective.

Many such meso-scale and micro-scale applications that specifically require fluid and/or gas pumping or pressurization cannot easily accommodate a conventional turbopump configuration, yet require the pressurization and pumping work capabilities provided by such a configuration. For example, microelectromechanical systems (MEMs), which are typically produced by microfabrication materials and processes, do not in general accommodate a conventional turbopump configuration. Yet many MEMs applications, e.g., micro-energy and micro-power systems, cannot perform optimally without an ability to achieve high levels of pressurization and/or pumping of a fluid.

SUMMARY OF THE INVENTION

The invention overcomes the challenges of implementation of a turbopump that is well-suited particularly for meso-scale and micro-scale systems, as well as for conventional macro-scale systems. In a turbopump in accordance with the invention there is provided a rotor having a first face and a second face and being characterized by a rotor axial height between the first and second rotor faces and by a rotor diameter. A rotor housing is provided, including bearing surfaces for supporting rotation of the rotor, including turbine inlet and turbine outlet ports and pump inlet and pump outlet ports, and including pump and turbine fluid sealing surfaces.

In the turbopump is provided a plurality of turbine blades of a selected turbine blade axial height disposed on a face of the rotor and a plurality of pump blades of a selected pump blade axial height are disposed on a face of the rotor. In accordance with the invention, the plurality of turbine blades and the plurality of pump blades can be together disposed on the first face of the rotor. Further or alternatively, in accordance with the invention, a turbopump axial height including rotor bearings, the turbine blade axial height, the pump blade axial height, and the rotor axial height, can be made less than the rotor diameter.

Where the turbine and pump blades are together disposed on the first face of the rotor, there can be provided an annular fluid sealing surface that is disposed on the first face of the rotor and located between the turbine blades and the pump blades. The annular fluid sealing surface cooperates with a corresponding housing sealing surface, and can be provided with an axial height for cooperation with the housing to operate as a forward thrust bearing of the rotor. Similarly, the rotor can be provided with an aft thrust bearing pad characterized by an axial height for cooperation with the housing to operate as an aft thrust bearing of the rotor.

The turbine blades can be provided as a plurality of radial-flow blades together of a common axial height and each of a constant axial height along blade radial extent. Similarly, the pump blades can be provided as a plurality of radial-flow blades of a common axial height and each of a constant axial height along blade radial extent. The turbine and pump blades can all be of a common axial height. Where included, the annular seal can be provided with a seal axial height that is common with the turbine blade axial height and the pump blade axial height.

In accordance with the invention, the turbine blades can be radially tapered in a plane of the rotor face to define turbine flow paths, disposed on a face of the rotor in a circumferential arrangement defining a radial inflow turbine. Similarly the plurality of pump blades can be radially tapered in a plane of the rotor face to define pump flow paths, disposed on a face of the rotor radially inward of the turbine blades and in a circumferential arrangement defining a radial outflow pump.

In accordance with the invention, there can be provided a plurality of turbine guide vanes supported by the housing at a radial periphery of the rotor. The turbine guide vanes can be provided as radial-flow vanes together of a common axial height with the plurality of turbine blades and each of a constant axial height along vane radial extent. Similarly, there can be provided a plurality of pump diffuser vanes supported by the housing at a radial periphery of the rotor.

In embodiments provided by the invention, the rotor is axially untapered, and can be provided as a planar disk; the rotor diameter can be made less than about 15 millimeters. The turbopump axial height, including rotor bearings, the turbine blade axial height, the pump blade axial height, and the axial rotor height, can be made less than the rotor diameter, and/or can be made less than about 1000 microns.

In accordance with the invention, the turbopump housing can further include injectors for injecting a hydrostatic thrust bearing fluid at a location between the rotor and the housing. Bearing surfaces of the housing can operate as hydrostatic or as hydrodynamic thrust bearing surfaces. The turbopump housing can further include one or more pressure balance plena connected for delivery of a pressure balance fluid between a face of the rotor and the housing.

A radial journal bearing of the rotor can be defined by a clearance between a radially peripheral edge of the rotor and a corresponding housing wall or alternatively, defined by a clearance between a radially central edge of the rotor and a corresponding central housing shaft about which the rotor is journalled for rotation. The radial journal bearing can be provided as, e.g., a gas journal bearing.

In accordance with the invention, the rotor, the turbine blades, and the pump blades of the turbopump can each be a microfabricated element having radial dimensions that are photolithographically defined. The rotor, the turbine blades, and the pump blades can each comprise, e.g., single crystal silicon, silicon nitride, silicon carbide, or other suitable material.

With this design details given above, the turbopump of the invention provides a turbine stage and a pump stage together on a single, common rotor, which can be configured for enabling centrifugal operation of both the turbine and the pump. No shaft or other mechanism is required to couple torque from a turbine rotor to a separate pump rotor; the torque generated by the turbine is directly applied to the pump by way of the common rotor. A centrifugal configuration for both the pump and the turbine enables support of the pump and rotor on a single, common rotor, and results in an elegantly simple turbopump design.

The turbopump of the invention can be employed in a wide range of applications and is particularly well-suited for addressing meso-scale and micro-scale applications in which microfabrication techniques are required for system manufacture. Other features and advantages of the turbopump will be apparent from the following description and accompanying drawings, and from the claims.

DETAILED DESCRIPTION OF THE INVENTION

The present invention enables realization of a turbopump configuration that can be implemented at the micro-scale, providing microturbopump componentry for power, propulsion, and thermodynamic cycling systems that achieve high component efficiencies at sizes on the order of microns to millimeters. The microturbopump componentry is equally applicable, however, to the macro-scale, and thus can also be implemented as conventionally-sized turbomachines for a wide range of applications.

Figure 1A:
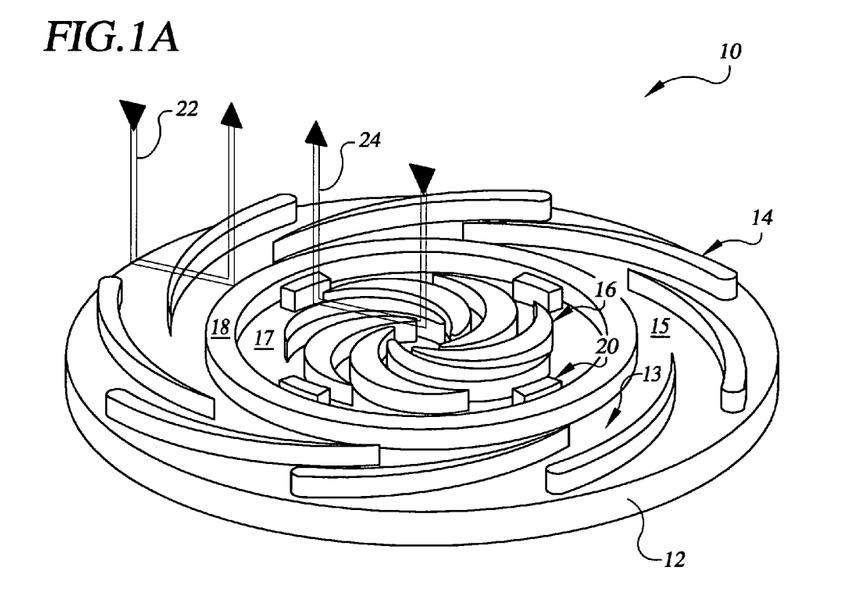
FIG. 1A is a perspective view of an example turbopump rotor provided by the invention for supporting both turbine and a pump blades.

With reference to the drawings, FIG. 1A depicts an example turbopump implementation 10 provided by the invention, here shown without a turbopump housing for clarity. The turbopump 10 includes a rotor 12 on a face 13 of which is provided a radial inflow turbine and a radial outflow pump. Radial inflow turbine blades 14 positioned around the periphery of the rotor 12 form the turbine 15. Radial outflow pump blades 16 positioned at a selected location, around the rotor 12, e.g., radially inward of the turbine blades 14, form the pump 17. An annular seal 18 positioned radially between the locations of the turbine blades and the pump blades separates the two systems by cooperating with a corresponding sealing surface of a rotor housing in the manner described below. Optionally, features 20 can be provided to enable diagnostic measurements of various rotor performance parameters such as speed, whirl, and/or other parameters.

Figure 1B:
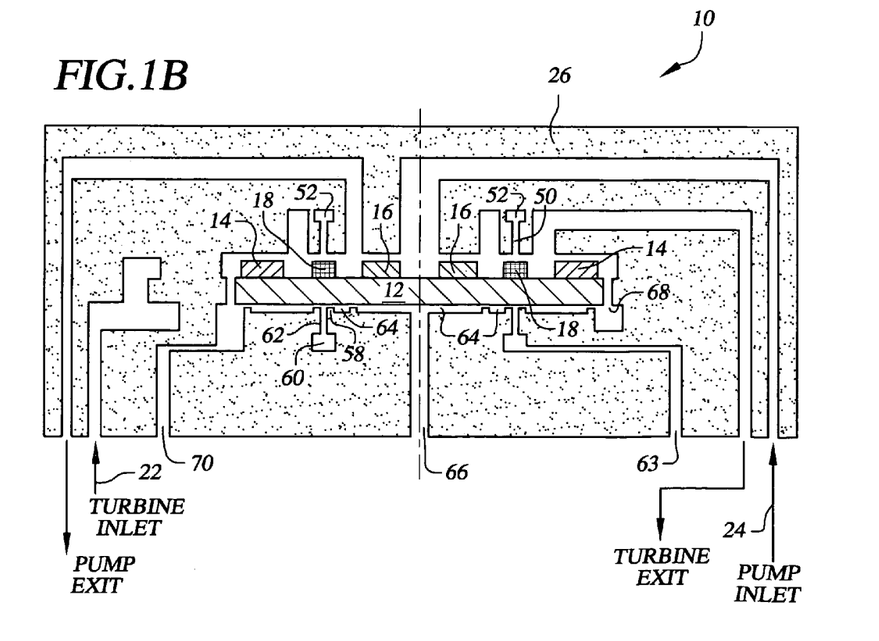
FIG. 1B is a schematic side view of a microturbopump housing provided by the invention and in which is disposed a microturbopump rotor having the design of FIG. 1A.

For operation, the turbopump rotor 12 is supported by bearings, such as radial journal bearings and forward and rear thrust bearings provided by the rotor housing, in the manner described below, to enable rotation of the rotor. With this configuration, fluid directed to the turbine blades 14 along a path 22 from the radial periphery of the rotor 12 causes the rotor to rotate. Correspondingly, a fluid directed to the pump blades 16 at the rotor center is pumped along a path 24 radially outward. FIG. 1B is a side view schematic of the turbopump 10 in a rotor housing 26 that accommodates journal and thrust bearings, described below, and that includes fluidic sealing surfaces providing isolated turbine and pump inlets and exits for enabling the turbine and pump paths 22, 24, respectively.

With this design and operation, it is demonstrated that the turbopump of the invention provides a turbine stage and a pump stage together on a single, common rotor, here employed for enabling centrifugal operation of both the turbine and the pump. No shaft or other mechanism is required to couple torque from a turbine rotor to a separate pump rotor; the torque generated by the turbine is directly applied to the pump by way of the common rotor. A centrifugal configuration for both the pump and the turbine enables support of the pump and rotor on a single, common rotor, and results in an elegantly simple turbopump design.

This turbopump configuration of the invention is particularly well-suited for implementation of a micro-scale turbopump manufactured by, e.g., micromachining techniques. In accordance with the invention, micromachining techniques can be employed to produce very high precision microturbomachine componentry using methods adopted from semiconductor processing. Beyond the precision enabled by this microfabrication processing, the economy of scale of microfabrication batch-processing results in the ability to very cost effectively produce large quantities of micro-turbopump componentry and microturbomachinery and assemblies.

Microfabrication of a microturbopump in accordance with the invention is enabled by and results in a planar, un-tapered, disk-like configuration that is characteristic of micromachining. As seen in FIGS. 1A–B, the turbopump's axial height is significantly less than its diameter. This is in great contrast to conventional turbomachinery, in which the axial height of the componentry is typically much larger than the componentry diameter. The planar nature of the turbopump of the invention enables integration of the turbopump with micro-scale systems and co-manufacture with such systems, to efficiently produce fully functional microturbomachinery systems including the capabilities of a turbopump.

Figure 2A:
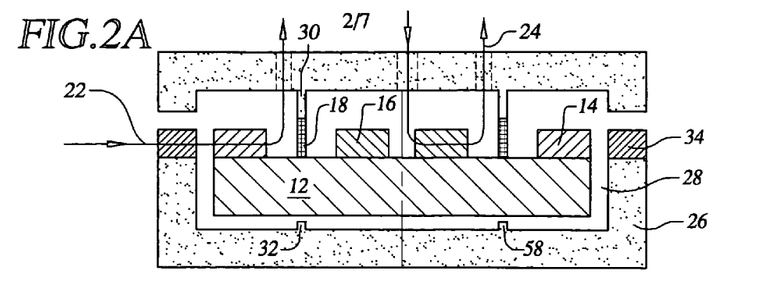
FIGS. 2A–2D are schematic side views of four microturbopumps provided by the invention, shown here in corresponding microturbopump housings.

Turning to FIGS. 2A–2D, there are shown additional turbopump designs provided by the invention. As shown in FIG. 2A, in one example design, the turbopump rotor 12 is positioned within a housing 26 that provides turbine guide vanes 34 radially outward of the turbine blades 14. As in the configuration of FIG. 1B, an annular seal 18 separating the turbine and pump is here employed to cooperate with a corresponding housing fluidic seal feature 30 in operating as a forward thrust bearing. Additional features 32 in the housing provide corresponding operation of aft thrust bearings. The radial periphery of the rotor 12 cooperates with an adjacent housing wall to provide a radial journal bearing 28, also in the manner of the configuration of FIG. 1B.

Figure 2B:
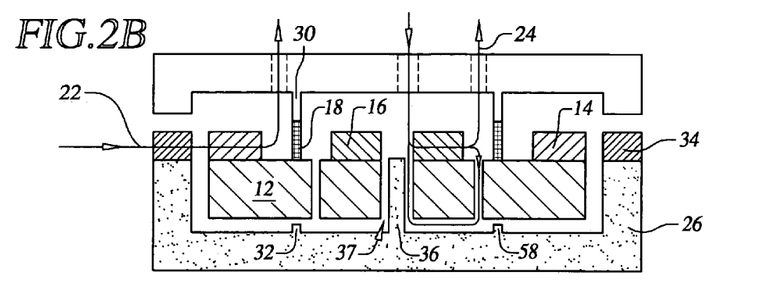

In a further turbopump design, shown in FIG. 2B, a center shaft 36 is provided to cooperate with a corresponding aperture 37 in the rotor 12, to implement a center journal bearing for the rotor. Here a path is provided through the rotor such that the bearing fluid that is directed to the pump blades 16 also can be employed in the journal bearing.

Figure 2C:
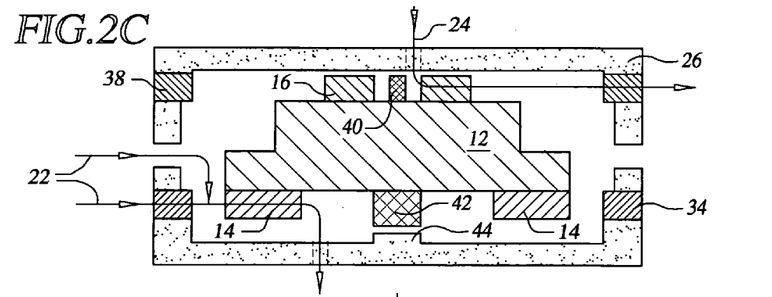

The invention does not require that the turbine blades and the pump blades be provided on a common face of the rotor. As shown in FIG. 2C, the turbine blades 14 can be provided on the rotor face opposite that of the pump blades 16. No annular seal is therefore required on the rotor to separate the turbine and turbine flows; the housing inlets and outlets are here sufficient for providing fluidic sealing surfaces in the housing itself. Further in this configuration, there can be provided in the turbopump housing both turbine guide vanes 34 and stationary pump diffuser vanes 38.

The radius of the rotor need not be constant along its axial height; as shown in FIG. 2C, the rotor radius can be adjusted to, e.g., implement a selected bearing configuration. For example, a radial journal bearing can be implemented at the periphery of the rotor with, e.g., the turbine inlet flow, in the manner shown, with corresponding outlets provided in the housing. The radius of the rotor at the location of the turbine inlet thereby defines the journal bearing; the rotor radius at the location of the pump blades can be quite distinct, and need not be as precisely defined or controlled. Fore and aft thrust bearings can be implemented with selected features 40, 42, 44 on the rotor and/or the housing as desired.

Figure 2D:
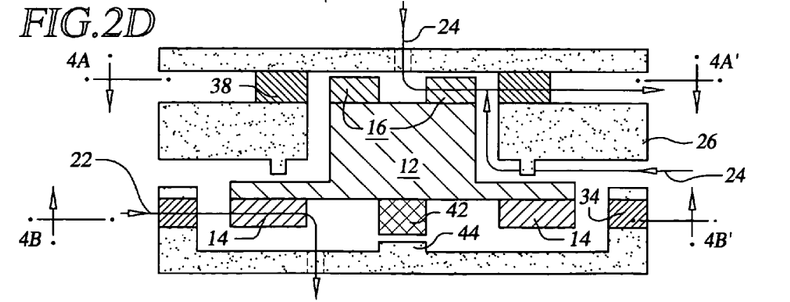

In an alternative turbopump configuration, shown in side view in FIG. 2D, the journal bearing is defined by the rotor radius at the pump blades 16, with the pump inlet flow 24 employed to provide the bearing fluid. The radius of the rotor at the location of the turbine blades can here be distinct from that at the location of the pump blades. Turbine vanes 34 and pump diffuser vanes 38 can both be implemented in the housing 26, along with fore and aft thrust bearings as desired for a given application.

Figure 3A:
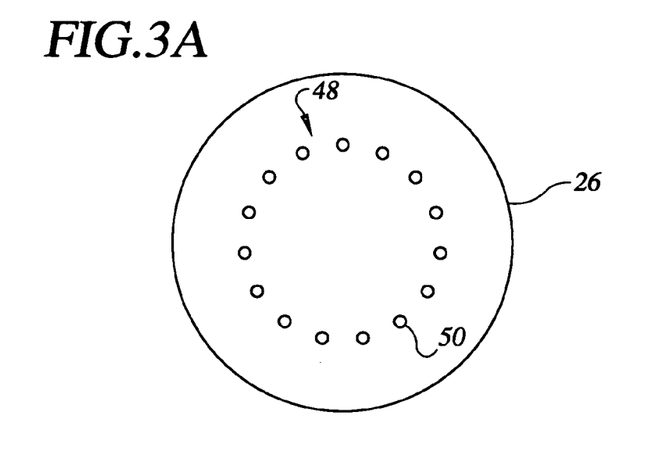
FIG. 3A is a schematic plan view of a turbopump thrust bearing nozzle configuration provided by the invention.

Turning to specific implementations of the bearings of the turbopump of the invention, thrust bearings can be implemented to keep the turbopump rotor centered axially in the turbopump housing. In an example thrust bearing implementation, hydrostatic bearings are implemented with a fluid supplied to forward and aft bearing locations. Referring to FIG. 3A, in one example configuration, a ring 48 of a number of injectors or capillaries 50, also shown in cross sectional side view in FIG. 1B, are provided in the housing 26 for delivering a forward bearing fluid at the location of the annular turbine/pump seal 18 on the rotor. The term fluid is here meant to refer to both liquids and gases; either can be employed in implementation of the bearings.

Figure 3B:
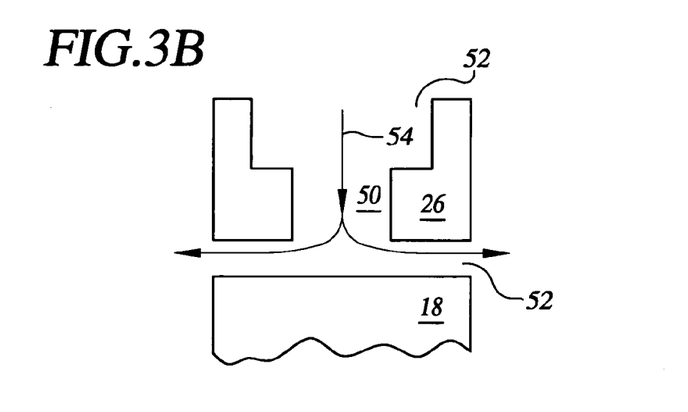
FIG. 3B is a schematic side view of a turbopump thrust bearing plenum and nozzle provided by the invention.

As shown in FIG. 1B and in more detail in FIG. 3B, a plenum 52 can be provided in the housing 26 to enable a path 54 for delivery of a forward thrust bearing fluid to each of the forward bearing injectors 50. For clarity, the injectors are not shown to scale in FIG. 3B; the injectors preferably are capillary in design, with their length significantly greater than their cross-sectional flow path. Fluid delivered through an injector is directed toward the annular rotor seal 18 and turns radially inward, toward the pump exit as well as radially outward, toward the turbine exit. This results in a distribution of pressure on the rotor seal 18. Even with the finite gap 56 between the housing 26 and the seal 18, the seal indeed operates to separate turbine and pump flows if the gap is sufficiently small, given the high pressure imposed in the gap by the bearing fluid flow.

The corresponding hydrostatic aft thrust bearing can be similarly implemented, including an annular pad 58, shown in FIG. 1B. This annular pad can be provided on the housing 26, as shown, in a configuration similar to that of the forward annular pad/seal 18, or alternatively, on the aft face of the rotor. A ring of a number of injectors or capillaries 62, also shown in cross sectional side view in FIG. 1B, are provided in the housing 26 for delivering an aft bearing fluid to the location of the annular pad 58. A plenum 60 is provided in the housing 26 and fed from an external source through a housing connection 63 to deliver aft thrust bearing fluid to each of the aft bearing injectors 62. This enables direction of bearing fluid to the annular pad 58 for distribution of pressure across the bearing pad. A similar forward thrust bearing housing connection to the forward thrust bearing plenum 52 is also included in the housing 26 but not shown in FIG. 1B for clarity.

In an alternative configuration, hydrodynamic, rather than hydrostatic, thrust bearings can be implemented. Here, no external fluid pressure source is required; thrust bearing pressure is generated within the bearing itself by the motion of the rotor relative to the housing. More specifically, as the rotor rotates, a pressure gradient is produced in the bearing by viscous drag of the rotor, increasing toward the rotor center. The resulting pressurized gas film provides thrust bearing load capacity and stiffness.

Figure 3C:
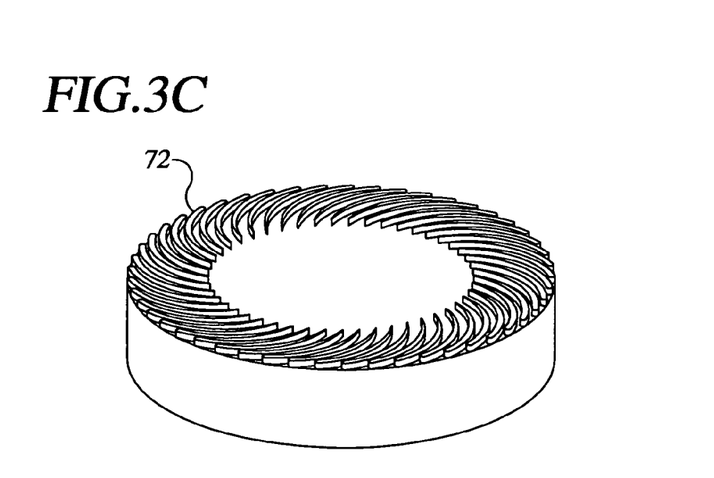
FIG. 3C is a schematic plan view of a turbopump hydrodynamic thrust bearing groove design provided by the invention.

Referring to FIG. 3C, in accordance with the invention, shallow spiral grooves 72 can be provided in the housing on a wall facing the rotor, or on a rotor face itself, to enhance the hydrodynamic bearing capacity. Viscous drag from rotation of the rotor generates a radial pressure gradient in the spiral grooves. It is to be recognized that the groove geometry can optimized for a desired maximum bearing load capacity under bearing dynamic stability.

In accordance with the invention, hydrostatic and hydrodynamic thrust bearings can be together incorporated. For example, the aft housing wall opposite the rotor can be provided with hydrostatic bearing injectors as shown in FIG. 3A as well as hydrodynamic bearing spiral grooves as shown in FIG. 3C. This hybrid bearing arrangement is well-suited for enabling rotor stability over a wide range of rotor speeds.

For applications in which the pump and turbine blades are provided on opposite rotor faces, as in the example designs of FIGS. 2C–D, it can be preferred to employ a centered thrust bearing pad and corresponding mating pad 42, 44, rather than an annular pad 58 as in the designs of FIGS. 2A–B. A centered pad does not interfere with the flow of fluid directed through pump or turbine blades on that face of the rotor.

Although thrust bearings are in general provided to support an axial load on the turbopump rotor, for many applications it can be preferred that the rotor be axially balanced when axially centered, whereby no load is presented to the thrust bearings during rotor operation; the thrust bearings then provide maximum stiffness. In one example implementation of this configuration in accordance with the invention, the operating pressure on the forward face of the rotor is determined and the operating pressure of one or more pressure balance plena 64 in FIG. 1B is then correspondingly controlled to balance the forward face operating pressures.

As shown in FIG. 1B, in this scenario, the aft thrust bearing annular pad 58 can function as a seal for the pressure balance plenum 64, which is fed from an external pressure source through an input channel 66 in the turbopump housing. The depth of the pressure balance plenum 64 is preferably selected to reduce drag on the rear face of the rotor. In operation, the pressure in the rear plena 64 is adjusted so that the force it applies to the rotor compensates for turbine and pump loadings of the rotor.

An annular journal bearing 68 is provided to support the rotor in the radial direction. This can be implemented as a hydrostatic or as a hydrodynamic bearing, or as a hybrid combination of the two. In a hydrodynamic journal bearing implementation, no external pressure source is required; rotor motion generates a load-supporting pressure at the bearing location. In a hydrostatic implementation, journal bearing pressure is applied between the edge of the rotor and the housing by delivery of a fluid from an external pressure source, for, example, from the pump flow, to the journal bearing location. Either gas or liquid journal bearings can be employed in accordance with the invention. As shown in FIG. 1B, a journal bearing housing connection 70 in the turbopump housing 26 enables delivery of the bearing fluid. The aft thrust bearing annular pad 58 operates to seal the journal bearing fluid from the aft pressure balance plenum 64.

Turning to the design of the turbopump turbine and pump blades, recall that in operation of the centrifugal, radial outflow pump, as a fluid exits the annulus of pump blades, it takes on a large angular momentum. If pump diffuser vanes are provided in the turbopump housing, radially outward of the rotor, this momentum is removed by the diffuser vanes and converted to a rise in pressure. In conventional centrifugal pumping configurations, the height of the pump rotor and blades and the diffuser blades typically change considerably across the rotor radius and through the diffuser in a manner that corresponds to the increase in gas density that occurs through this path.

In contrast, in the turbopump pump of the invention, the axial rotor height can be held constant across the radius of the rotor, the pump diffuser vane height similarly can be held constant, and the pump blades can be untapered, i.e., the heights of the blades can be constant across their length, can be stepped, or can change minimally. The flow area of the pump and diffuser is instead changed substantially only by varying the blade and diffuser vane thickness in the plane of the blades and vanes. As a result, the configuration is quite planar, with the axial height of the structure being much less than the diameter of the structure. Such an untapered, layered configuration enables ease of manufacture by microfabrication technologies and integration with other microfabricated systems and electronics.

In one example blade design in accordance with the invention, the blade thickness, in the plane of the rotor, is tapered specifically to produce a blade shape that follows the path desired for flow streamlines through the pump or turbine. For example, the blades can follow log spiral streamlines. Here the trailing, i.e., radially peripheral, blade edge is angled close to about 90 degrees from the rotor radial line, yielding a large exit relative flow angle. A high exit swirl angle, e.g., of over about 80 degrees in the absolute frame, is also yielded.

Whatever blade design is selected, the design preferably yields a flow path that is resistant to cavitation, a deleterious condition in which the local static pressure of regions of the flow path can fall below the vapor pressure of the fluid. Such a condition leads to pockets that hamper the desired flow path. If the blade design cannot itself inhibit cavitation, then the pump fluid source is preferably pressurized to a level that sufficiently does so.

Figure 4A:
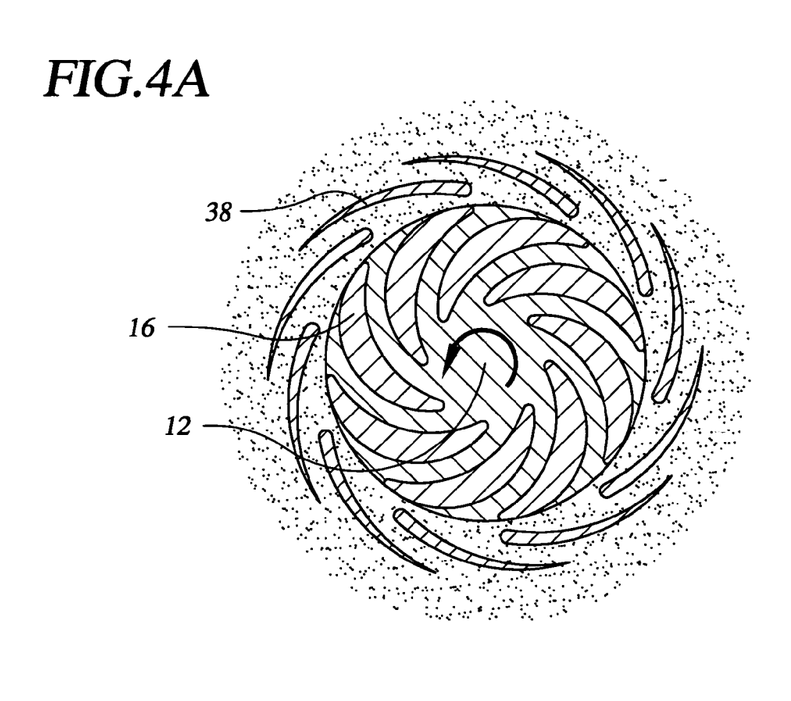
FIG. 4A is a schematic plan view of a turbopump pump design provided by the invention and including pump diffuser vanes.

For many applications, it can be preferable to include pump diffuser vanes 38 as shown in FIGS. 2C and 2D in the turbopump system if such can be accommodated by the turbopump housing, to control diffusion at the output of the pump. FIG. 4A is an aft-looking plan view taken through the turbopump view of FIG. 2D at the pump, showing an example configuration of pump blades and diffuser vanes. In one example configuration, as shown here, the diffuser vanes 38 are shaped, e.g., slightly offset from a log spiral design. This allows for a slow area expansion, controlling the rate of diffusion to keep separation under control. With this vane shaping, and with staggering of the vanes 38 with respect to the pump blades 16 in the manner shown, a relatively compact radial extent is achieved.

Figure 4B:
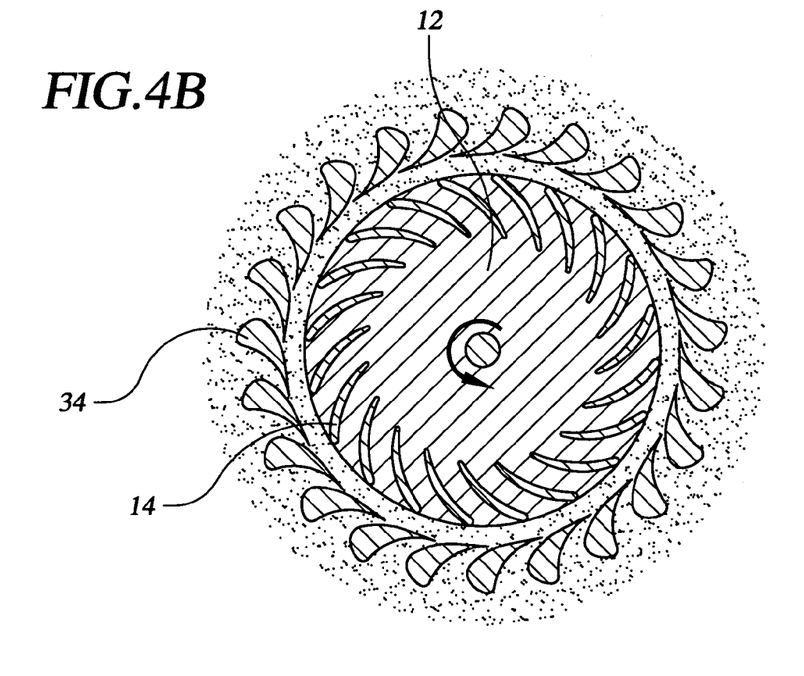
FIG. 4B is a schematic plan view of a turbopump turbine design provided by the invention and including turbine vanes.

In accordance with the invention the turbopump turbine blades, like the pump blades, can be shaped in the plane of the rotor, as shown in FIG. 4B, which is a forward looking plan view taken through the turbopump view of FIG. 2D at the turbine. Turbine guide vanes 34 can be provided radially peripheral to the turbine blades 14. Fluid flowing radially inward through the array of vanes 34 is accelerated by the vanes and swirl is imparted to the flow. The turbine blades further expand the fluid as it moves inward and remove the swirl, thereby producing rotational power. The flow path turning through the turbine blade row is preferably designed based on a desired turbopump power; an increase in flow turning through the blade row increases the turbine pressure drop and correspondingly increases the turbopump power.

To achieve high efficiency, the turbine guide vanes are preferably designed for high absolute as well as relative velocity at their exit, while the turbine rotor blades are preferably designed to minimize the absolute velocity at their exit. In a conventional radial inflow turbine, this is achieved with endwall contouring to control flow area, combined with a selected blade exit angle. In accordance with the invention, this can be instead achieved by tailoring turbine blade thickness as a function of rotor radius while maintaining a substantially constant blade height along the rotor radius. This tailoring of blade shape to control area reduction between blades allows for control of the acceleration of flow, providing better control over the absolute exit velocity. The trailing edge blade angle is also preferably selected to reduce the exit absolute swirl velocity and further is preferably selected based on consideration for viscous loses and low Reynolds number blockage effects that may be present in a micro-scale implementation of the turbopump.

For many applications, it can be preferred in the manner described above to tailor the turbine and pump blade thickness, in the plane of the rotor, as a function of rotor radius while maintaining an untapered blade height. But the invention does not universally require such. If the turbopump is to be implemented at the meso- or micro-scale, then a planar configuration like this can be preferred for simplifying the system microfabrication. But if the turbopump is to be implemented at the macro-scale, then tapered blade geometries can be employed, in a manner corresponding to the requirements of a given application. And further, if a suitable manufacturing process is provided and corresponding componentry will allow, then the turbopump blades and vanes can be tapered, even on the micro-scale.

The inventors herein have recognized microfabrication and micromachining techniques that can enable the precise manufacture of meso- and micro-scale turbopump componentry for producing a microturbopump. In one example process by provided by the invention, the microturbopump is microfabricated of silicon and related microfabrication materials, with single crystal silicon employed as the mechanical material of the rotor, pump and turbine. Referring to FIGS. 5A–5F, such can be achieved, with the process described below, by employing single crystal silicon substrates to produce layers, or structural plates, of the microturbopump structure, with the plates bonded together in a final laminar-like assembly. In such a scenario, as shown in the figures, each fabricated layer or plate, 80, 82, 84, 86, 88, 90 can be processed individually to a large extent, minimizing process complexity.

FIGS. 5A–5F represent the microturbopump plates in an exploded sequence corresponding to their assembled order, for a microturbopump design like that of FIGS. 1A–1B; each figure here illustrates the upper surface of each plate, to the left of the figure, and illustrates the lower surface of each plate, to the right of the figure. The resulting assembly provides a housing like that of FIG. 1B, with a fully released and rotatable turbopump rotor provided internal to the housing and trapped within the housing, and enables diagnostic and other access to the rotor. This configuration is provided as one example in accordance with the invention, but is not universally required; the turbopump rotor can be provided in any convenient manufacturing sequence and manually or otherwise then assembled into a housing or other structure that is convenient for a given application. In addition, although this example process sequence is shown to result in a rotor having turbine and pump blades on a common rotor face, such is not required; the pump and turbine blades can be fabricated on opposite rotor faces with the same process sequence.

Considering the specifics of a fabrication scenario for the microfabricated plates of FIGS. 5A–5F, each plate of the assembly is produced from a single crystal silicon wafer that has been cleaned in the conventional manner. A 0.5 µm-thick layer of silicon dioxide is thermally grown on each wafer, and then plate assembly alignment marks are etched into the wafer, employing conventional photolithographic and silicon plasma etching processes to etch, e.g., 0.5 µm-deep alignment marks in the wafer.

Figure 5A:
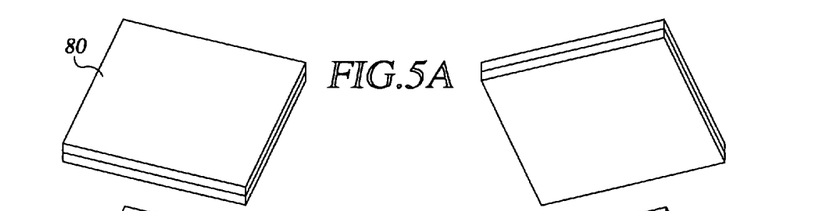
FIGS. 5A–5F are schematic perspective views of planar layers microfabricated in accordance with the invention for assembly as a microturbopump and housing like that shown in cross section in FIG. 1B.
Figure 5B:
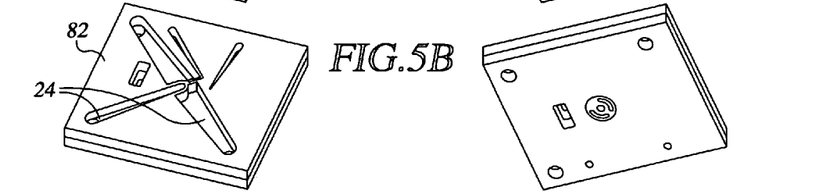
Figure 5C:
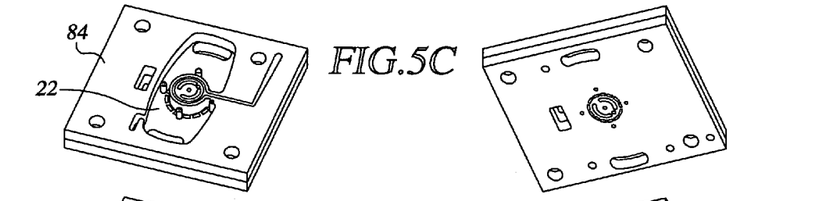
Figure 5D:
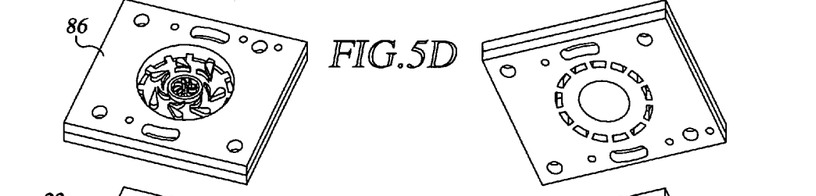

In a first process step, the microturbopump rotor plate 86 is produced, as shown in FIG. 5D. The turbine and pump blades, exhaust and inlet ports, and turbine vanes are defined by photolithographic patterning of a photoresist layer. The thrust bearing is not at this point defined; instead, a grid of oxide release pads is defined for enabling a final micromachining release of the rotor within the microturbopump housing, in the manner described below. With the photoresist patterned, the underlying oxide layer is correspondingly patterned, e.g., by a plasma oxide etch process, and then the silicon is etched, e.g., with a silicon plasma etch process. Reactive ion etching is preferred for enabling deep and straight sidewalls in the etched silicon features. It can be preferred for many process scenarios to carry out a number of patterning and etch sequences to enable etching through substantially an entire silicon wafer in the formation of a turbopump feature such as the rotor. Once silicon wafer etching is complete, the photoresist is removed and the wafer cleaned in the conventional manner.

An important aspect of the fabrication sequence is control of the silicon plasma etch process. For many applications it can be preferred to employ a very well-controlled and reproducible deep reactive ion etch process. In an example preferred process, an $SF_6$-based plasma trench etch chemistry, available from Surface Technology Systems, Ltd. (STS), of Redwood City, Calif., is employed. This trench etch chemistry and process are described in U.S. Pat. No. 5,501,893, issued Mar. 26, 1996, the entirety of which is hereby incorporated by reference. As can be understood, other plasma etchers and etch chemistries can be employed; preferably, the etcher and chemistry selected are capable of etching deep trench geometries having high aspect ratios and smooth planar sidewalls.

Figure 5E:
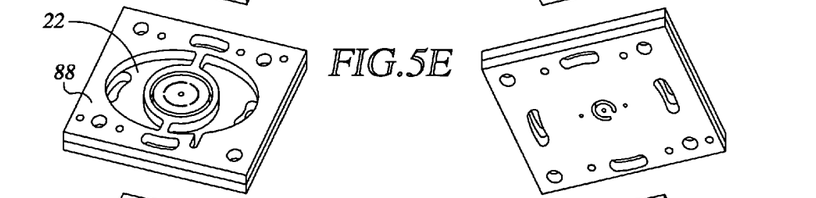
Figure 5F:
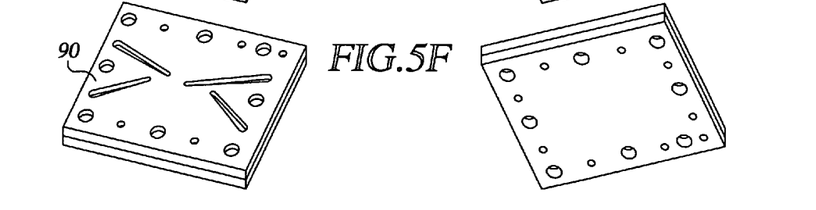

In a next process step, the bearing and inlet plate 88 is produced, as shown in FIG. 5E. Here is defined the aft thrust bearing, the journal bearing plenum, and the turbine inlet. First the thrust bearing and blade tip clearance are photolithographically defined and etched into the thermal oxide layer, e.g., to about 4.5 µm in depth. Then the photoresist is removed and a layer of about 0.5 µm-thick thermal oxide is grown on both sides of the wafer. The blade tip clearance and journal bearing plenums are then photolithographically defined in the resulting thermal oxide, e.g., by a liquid buffered oxide etch (BOE) step.

Next, the backside of the wafer is processed, by photolithographically defining the thrust bearing plenums and journal bearing nozzles in the oxide, etching the oxide, e.g., by a BOE etch step, and then plasma etching the thrust bearing plenums and journal bearing nozzles in the silicon wafer. The opposite side of the wafer is then processed to fully define the thrust bearing nozzles and journal bearing plenum. If the nozzles and plenum are to extend widely, it can be preferred to employ a break-away, or "halo" etch that enables large chunks of the silicon wafer to be etched free rather than directly attacked by the etch. This provides an efficient etch process and well-defined etch features.

To fully produce the bearing nozzles and journal bearing plenum, these features are first etched in the oxide layer, and then the wafer is mounted to a handle wafer for ease of process. The handle wafer is preferably attached using an adhesive process that enables removal of the handle wafer at a later stage of the sequence. In one example adhesive process, a photoresist layer of between about 1 µm–5 µm in thickness is spin-coated on the handle wafer. The handle wafer is then pressed against the plate 88 and the entire composite structure is heated at a temperature of about 90° C. for about 30 minutes. This produces a sufficient fixation of the handle wafer to the structure. The handle wafer facilitates manipulation of the laminated structure during lithographic and etching processes.

The device wafer is then etched to fully open the nozzles and plenum and the handle wafer is removed. In one example handle wafer release process, the handle wafer and composite structure are immersed in a photoresist solvent, e.g., acetone, and the handle wafer is manually removed as the acetone attacks the photoresist adhesive layer. Finally, the blade tip clearance is defined by a further silicon plasma etch.

In a next process step, the plate 84 providing the forward thrust bearing and turbine exit plenum is produced. Here, the blade tip clearance, turbine and pump exhaust and inlet ports, and the thrust bearing are first photolithographically defined and etched into a layer of photoresist and the oxide layer on a first wafer side. Then, on the opposite wafer side, the turbine and pump exhaust and inlet ports and the thrust bearing plenum are defined and etched into the oxide layer. These features are then etched half-way through the wafer and the photoresist on that second wafer side is removed.

At this point, the wafer is then mounted to a handle wafer in the manner described above and the first wafer side is processed to define thrust bearing nozzles and turbine and pump exhaust and peripheral holes. As described above, it here can be advantageous to employ a halo pattern and etch to easily remove large chunks of the wafer. The silicon wafer is then etched though its thickness to meet the back side etching, whereby the nozzle, exhaust, and holes are fully opened. The photoresist and handle wafer are then removed, and the tip clearance etched in the silicon wafer.

At this point in the fabrication sequence, it can be preferred to fusion bond the thrust bearing plate 82 with the rotor plate 86. Fusion bonding of the wafers can be carried out in the conventional manner, preferably with diagnostic steps included to validate the quality of the fusion bond between the wafers. The fusion bonding process can be completed by, e.g., the conventional sequence of first cleaning the two wafers in an RCA cleaning step, then contacting the wafers in a manner that eliminates air pockets between the wafers, and then annealing the contacted wafers in an inert gas at a temperature of between about 800° C.–1100° C. for about 60 minutes.

Once bonded, the backside of the rotor plate is then processed. Specifically, the journal bearing and peripheral holes are photolithographically patterned. It can be preferred to apply two or more sub-layers of photoresist to the wafer to enable effective plasma etching of the silicon wafer to produce a relatively deep and quite narrow gap at the edge of the rotor in formation of the journal bearing. To complete this etch, the wafer pair can advantageously be bonded to a handle wafer and then the etch completed through the thickness of the wafer. The photoresist and handle wafer is then removed.

The forward cap plate 82 and aft cap plate 90 are then produced. Here the pump inlet and exit are defined on the forward cap plate 82 and diagnostic and test ports defined on the aft plate 90. The features are defined and etched in the oxide on the front side of the two wafers, and then plasma etched into the silicon wafers themselves. The features are then defined and etched in the oxide on the back side of the wafers and the front side of the wafers bonded to corresponding handle wafers. The back side of the wafers are then plasma etched through the thickness of the wafer to fully define the features. The handle wafers and photoresist are then removed.

In a final assembly step, all of the wafer plates are fusion bonded together in the conventional manner. Then a micromachining release step is carried out to fully release the rotor from the oxide release pads within the housing to which the rotor is at this point is connected. This rotor release can be carried out by, e.g., employing a liquid HF ultrasound etch to etch away the oxide release features. A thorough rinse, e.g., an ultrasound rinse step, is then preferably carried out to fully remove the HF from the structure. Finally, if desired, a glass plate 80 or other selected plate can be bonded, e.g., by anodic bonding, to the assembled stack and holes provided in the plate to enable visual as well as mechanical access to the housing and internal rotor. With this assembly, the turbine flow path 22 is defined with a turbine flow inlet, from plate 88 and a turbine flow exit, from plate 84. Similarly, the pump flow path 24 is defined with a pump flow inlet and exit, both on plate 82.

At the completion of a suitable manufacturing process, the turbopump of the invention can be packaged to produce a self-contained, portable microturbopump system. As is clear from the earlier discussion, this portable system can be configured for use in a portable source of power, a source of thrust, a thermodynamic cycle, or other selected system. Preferably, the selected packaging accommodates connections to the sources of bearing fluid and to the turbopump drive source, e.g., a source of a fluid.

The invention contemplates the use of a range of materials in addition to or in substitution for silicon as the mechanical rotor material. For example, structural silicon microcomponentry can be coated with a relatively inert material, e.g., a $Si_3N_4$ coating, for improved chemical resistance. As an alternative to silicon, the structural components of the microturbopump can be fabricated as a practical matter substantially entirely from SiC, from $Si_3N_4$, or from a combination or silicon—silicon carbide or silicon—silicon nitride systems. As can be readily understood, the wide range of materials considerations for a given microturbopump application will dictate a preferred material or material combination.

A silicon microturbopump was experimentally fabricated in accordance with the invention with silicon wafers processed in the manner described above and the resulting plates fusion bonded together to produce a fully functional microturbopump assembly. Table I below provides dimensions and other design parameters for the experimental microturbopump.

TABLE I

| Microturbopump Parameter | Example Design Value |
| --- | --- |
| Rotor Diameter/Turbine outer diameter | 6. mm |
| Pump outer diameter | 2 mm |
| Turbine and Pump blade height | 225 µm |
| Turbine blades | 8 |

TABLE I-continued

| Microturbopump Parameter | Example Design Value |
|---|---|
| Turbine guide vanes | yes |
| Pump blades | 7 |
| Journal Bearing length | 300 μm |
| Journal Bearing clearance | 10 μm |
| Journal and Thrust Bearing phase | gas |
| Thrust Bearing gap | 5 μm |
| Thrust Bearing diameter | 12 mm |
| Thrust Bearing length | 100 μm |
| Thrust Bearing pressure | 40 atm |
| Thrust Bearing injectors | 12 mm dia./60 injectors |
| Thrust Bearing pad width | 400 μm |
| Pressure Balance aft plenum depth | 60 μm |
| Pressure Balance aft plenum radius | 1.5 mm |

With these specifications, microturbopump operational performance provides for a pump inlet pressure of about 2 atm, pump outlet pressure of about 32 atm, i.e., a pump pressure rise of about 30 atm, and a pump mass flow of about 2.5 g/s, requiring about 36 W of power at room temperature for the pumping of water. The corresponding turbine inlet pressure is about 24 atm, turbine outlet pressure is about 9 atm, with a turbine mass flow of about 2.5 g/s and a delivery of about 50 W of power, here with air employed as the driving turbine supply. The bearings and aft pressure balance plenum produce a drag of about 1.13 W with this design. To realize full performance of the turbopump, it is preferable that, as with any turbopump, the pump fluid be filtered so as to prevent entry into the pump of particles and/or objects of a size that might clog the pump and the related componentry such as bearings and/or seals.

It is to be recognized that the dimensions and corresponding performance parameters given above are examples only; a wide range of dimensions can be accommodated by the turbopump design of the invention. For example, the rotor diameter can be of any selected size that is amenable to a manufacturing process; for microfabrication processes, a rotor diameter of about 15 mm or less can be produced, for example. For micro-scale implementations, the rotor thickness, i.e., rotor axial height, is set by the thickness of layers employed to produce the rotor, in the manner described below. For example, a rotor axial height of about 225 μm can be produced by microfabrication, as can turbine and pump blades.

The turbopump of the invention can be employed to address a wide range of applications, given the ability provided by the invention to scale the turbopump from the macro-scale of conventional machinery down to the meso- and micro-scale. Any application for pumping of a working fluid at a pressure requiring a power input like that provided by a turbine is well-addressed by the turbopump of the invention. The elegantly simple design enabled by elimination of a torque transmission shaft and multiple distinct rotors enhances the wide applicability of the turbopump design and enables ease of integration into a system.

Considering meso-scale and micro-scale turbopump machinery, the microfabrication techniques provided by the invention for production of a microturbopump enable a wide range of device adaptations. For example, in the case of support and/or supply systems for the microturbopump, such systems can be implemented coplanar and fabricated simultaneously with the microturbopump and yet take on different out-of-plane geometry by virtue of, e.g., a stacked assembly of individually processed wafers. Thus, the addition of support and/or supply systems, while extending the microturbopump size, do not result in an increase fabrication complexity. Electronic and mechanical support, control, and diagnostic subsystems can thus be monolithically integrated with the microturbopump at the wafer level, or can be modularly integrated at the die or package level.

Figure 6:
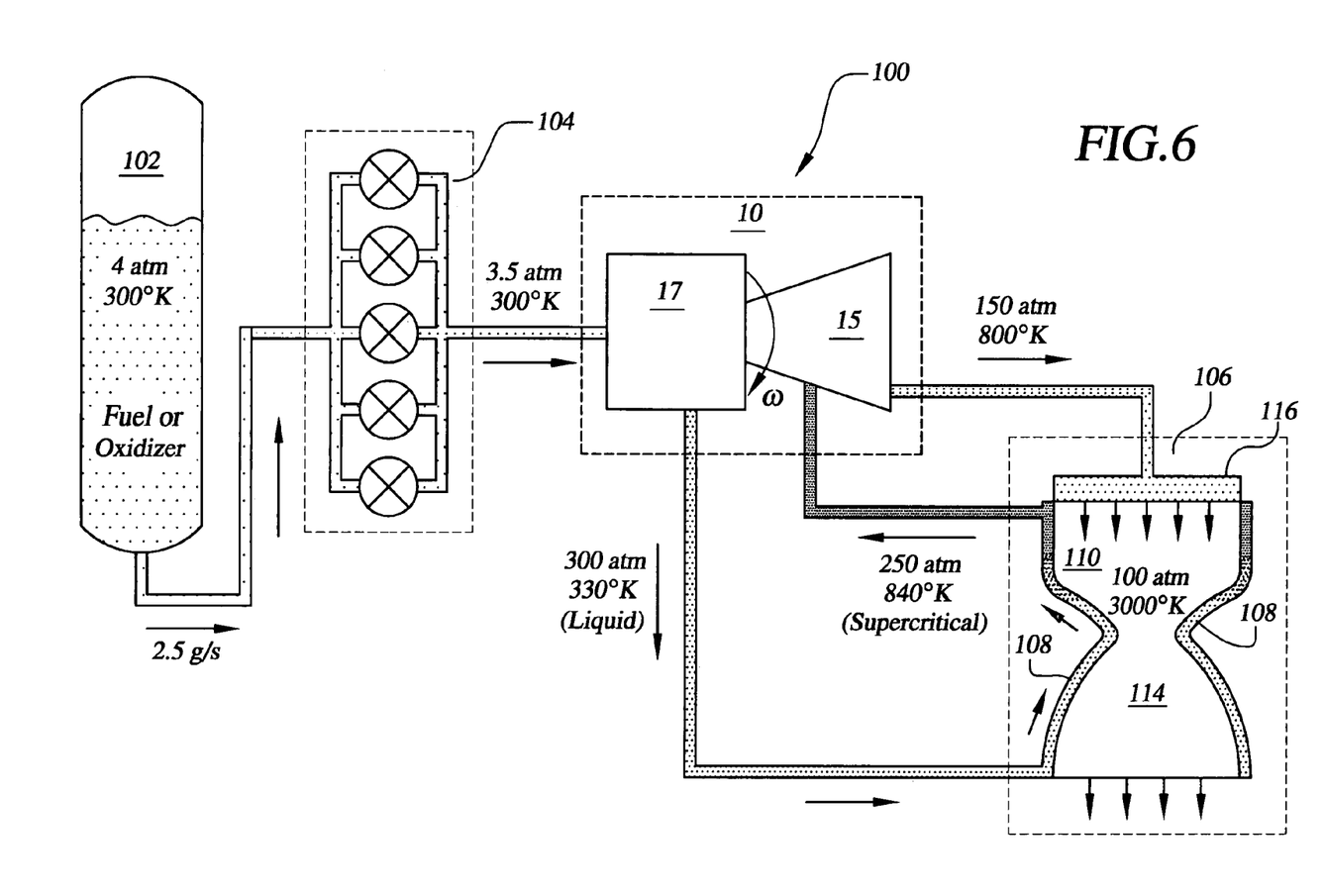
FIG. 6 is a schematic representation of implementation of a microturbopump provided by the invention in a microrocket and employing an thermodynamic expander energy cycle.

Considering a specific application, the microturbopump provided by the invention is particularly well-designed for use in delivery of a fluid to a micro-scale application site. In one such example, the microturbopump can be employed for pressurizing the propellants to be delivered to a micro-scale liquid fuel rocket engine or micro-propulsion system in accordance with the invention. FIG. 6 is a schematic of such a microrocket engine system 100 in which the microturbopump of the invention is implemented, here showing the system for one of two propellants employed. The microturbopump 10 is provided for enabling a selected thermodynamic cycle, such as an expander thermodynamic cycle, with the microrocket and the propellant.

As shown in the figure, liquid fuel or oxidizer 102 provided at a source is directed through a metering valve array 104 to the pump 17 of the microturbopump 10. From the pump the fuel 102 is directed to the microrocket 106. The fuel 102 is here first fed through a microrocket cooling jacket 108 at the periphery of a combustion chamber 110 and exhaust expansion bell 114, where the fuel gains significant thermal energy. At this point, the fuel, now in a supercritical state, is directed to the microturbopump turbine 15 for producing microturbopump power. The fuel exits the turbine 15 and is directed to microrocket fuel injectors 116 to be mixed and burned at the combustion chamber 110 with oxidizer.

Figure 7A:
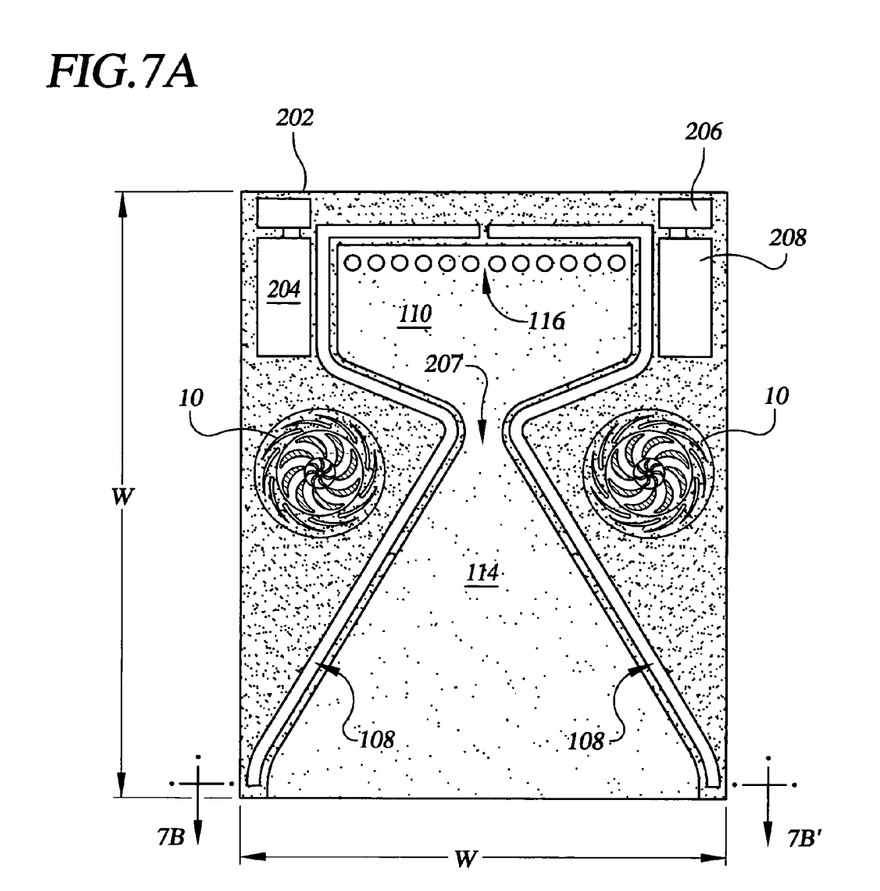
FIGS. 7A and 7B are schematic plan and cross-sectional views, respectively, of a microrocket in which the microturbopump of the invention is implemented.
Figure 7B:
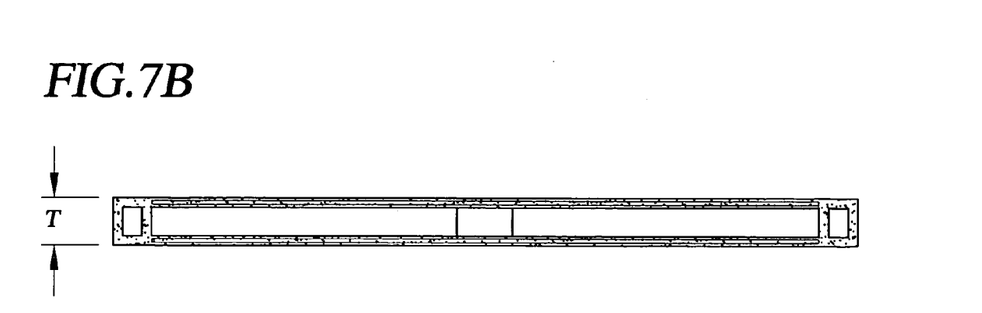

FIGS. 7A–7B illustrate the microrocket configuration more specifically. This configuration provides a complete bipropellant microrocket motor. Two microturbopumps 10 are employed, one for fuel and one for oxidizer. A fuel inlet 202, fuel metering microvalve 204, oxidizer inlet 206, oxidizer metering microvalve 208, and injectors 116 are in connection with the microturbopumps to enable the system configuration of FIG. 6. Fuel and oxidizer are delivered to the combustion chamber 110 through the array of injectors 116 where they mix and then are burned. The resultant hot combustion gases exit the combustion chamber through a nozzle throat 207 to the exhaust expansion bell 114.

The invention contemplates driving of the microturbopump turbine by other than the expander cycle described above. For example, the microturbopump could instead be driven by hot gases generated in a separate small combustion chamber, as in a gas generator cycle, by a hot gas bleed from the main combustion chamber, by several smaller electric propellant micropumps operating in parallel, or other selected configuration. These various subsystems can be microfabricated monolithically or in a modular fashion in the manner discussed above.

In an example of the arrangement shown in FIGS. 7A–7B, the length, L, of the microrocket engine is about 16 mm, the width, W, is about 12.5 mm, and the thickness, T, of the microrocket engine is about 1 mm. The length and width of the engine is thus about 10 times that of the thickness. With this geometry, and using propellants such as nitrogen tetroxide and hydrazine, hydrogen peroxide and a liquid hydrocarbon such as JP-7 or JP-8, or LOX and a hydrocarbon, those propellants having an Isp of about 300 sec, the microrocket engine produces about 4.515 N, or 1–3 lb, of thrust, while consuming about 1.5–5 grams per second of fuel. At this operational level, the thrust chamber pressure is about 125 atm and pumping power of between about 10–40 watts is required. This microrocket engine configuration is characterized by a thrust-to-weight ratio of about 1000:1, a figure much superior to the 15:1 ratio for a conventional motor in this thrust range and even the 70:1 ratio characteristic of large engines such as space shuttle main engines.

The microfabrication techniques and corresponding materials of the microturbopump of the invention restrict the practical upper limit of the microrocket engine size, while microfluid performance degradation at small sizes, e.g., in the range of hundredths of pounds of thrust, restricts the practical lower limit of the microrocket engine size. In addition, the general microrocket engine features are constrained in their geometry to pseudo two-dimensional features by the inherent planar nature of the microfabrication process. For example, the propellant nozzle expansion area is in-plane, rather than three-dimensional as is conventional. With this constraint, the microrocket thrust is limited to about 10–20 N.

Larger thrusts can be obtained if a micro-power head stage, including, e.g., micropumps, microvalves, and microinjectors, is mated to a separate thrust chamber and nozzle, or alternatively, if linear aerospike nozzle geometries are employed. With this arrangement, mass flows of about 50–100 grams per second can be obtained to yield up to about 450 N, or 100 lbs, of thrust. This level can be further increased using multiple micro-power head stages configured to feed a common nozzle. Intermediate sizes are also accommodated by the microrocket motor design. For example, a micro-power head, chamber, and throat can be microfabricated separately, thereby taking advantage of the relatively easy regenerative cooling arrangements afforded by the microfabrication techniques, and then mated to an uncooled expansion bell.

Considering the impact of material selection on the microrocket engine, preferably, the material selected is amenable to regenerative cooling by the fuel prior to its driving of the turbopump turbine. The regenerative cooling technique of the microrocket motor is intended to cool the walls to maintain mechanical integrity of the walls. It also provides thermal control and limits excessive heat loss. If silicon is selected as the microrocket motor wall material, then for some applications, a coating of a material such as SiC or $Si_3N_4$ that is relatively impervious to propellants as well as resistant to oxidation may be preferable. Because candidate materials are generally stronger in their microscale configuration than in a corresponding macroscale configuration, non-optimum planar geometry of the pressure vessel can be accommodated. Furthermore, because the wall thickness can be quite narrow, the micro-high pressure vessel enables very high thrust-to-weight ratios without undue weight penalty. The limit to chamber pressure is heat flux and the resultant wall temperature at critical locations such as the nozzle throat.

Other details of a microrocket in which the microturbopump of the invention can be employed and microfabrication processes for microturbomachinery that can be utilized with the microturbopump are provided in U.S. Pat. No. 5,932,940, entitled "Microturbomachinery," issued Aug. 3, 1999, the entirety of which is hereby incorporated by reference.

Considering specific applications of a bipropellant microrocket motor in which the microturbopump of the invention is implemented, applications span the entire range of rocketry, from microsatellite altitude control to space tugs to tactical rockets, and even to launch vehicles. While the advantages vary with the application, they all include very much lower weight and manufacturing cost, as well as higher performance, than conventional small-sized rockets. Independent of application, the advantages of microfabrication just mentioned particularly apply here. Integration of the microturbopump, along with microvalves, plumbing, microinjectors, and a pressure chamber together on a planar substrate greatly increases the reliability, reduces weight, and dramatically reduces cost below that required for manually machined and assembled rocket components.

Employed alone, a single turbo-pump-fed microrocket module can be used for satellite altitude control. A pump feed scenario is here enabled, eliminating the need for conventional pressurization storage bottles and high pressure fuel tanks and delivery lines, thereby greatly reducing the propulsion system weight. This in turn enables an accommodation of increased weight in other satellite systems.

Arrays of microrocket motors also can be employed to form very lightweight and highly redundant larger propulsion systems for a range of applications. For example, a microrocket motor array can be employed as an orbital transfer vehicle. Several hundred microrocket motors can here be employed to provide the thrust requirement of about 5000 N. Redundant microrocket motors can be provided for, e.g., reliability, or for thrust vectoring to replace the relatively heavy motor gimbals and hydraulic systems conventionally employed to change motor direction. The very small size of the individual microrocket motors yields very fast startup and shutdown times, enabling precise impulse increments to be imparted to a vehicle. As mentioned previously, bipropellant configurations of the microrocket motor are here particularly advantageous to increase specific impulse over that achievable by monopropellant microrocket motors.

Other applications include microchemical rocket engines such as low-cost boosters for small satellites. A microrocket motor can provide launch propulsion for very small, e.g., 1–10 kg, satellites. Even large booster propulsion, such as single stage to orbit spacecraft propulsion, can be addressed with a microrocket configuration in combination with other microturbomachinery. The very high thrust-to-weight ratio, the compactness, and the possible redundancy of such a system provide an attractive alternative to conventional booster configurations.

Beyond the microrocket applications just described, the microturbopump is well-suited for addressing a range of thermodynamic cycles such as the expander cycle of FIG. 6. Refrigeration cycles, bottoming cycles, and other thermodynamic cycles can be implemented at the micro-scale, meso-scale, or macro-scale by employing the microturbopump of the invention. The very light weight and compact form factor of the microturbopump enable integration of a thermodynamic system with portable electronics and other devices for achieving autonomous energy cycling systems.

In addition, micro-scale applications requiring pumping of reactants to a reaction site are very well addressed by the microturbopump of the invention. For example, the reactants for a high-power chemical laser can be pumped to a reaction site by corresponding microturbopumps configured in accordance with the invention to deliver reactants. But it is important to note again that the turbopump configuration of the invention is not limited to the microscale. Conventional macro-scale applications can be addressed with a macro-scale implementation of the shaftless, single rotor turbopump of the invention.

From the foregoing, it is apparent that the turbopump provided by the invention can be implemented across a wide range of turbomachinery size regimes. The turbopump can be implemented at the microscale, enabling a micro-scale realization of thermodynamic, energy, and reaction systems with both superior performance and unitary structural manufacturing processes employing microfabrication techniques. It is recognized, of course, that those skilled in the art may make various modifications and additions to the embodiments described above without departing from the spirit and scope of the present contribution to the art. Accordingly, it is to be understood that the protection sought to be afforded hereby should be deemed to extend to the subject matter claims and all equivalents thereof fairly within the scope of the invention.

We claim:

1. A turbopump comprising:
a rotor having a first face and a second face and being characterized by a rotor axial height between the first and second rotor faces and by a rotor diameter;
a plurality of turbine blades of a selected turbine blade axial height disposed on the first face of the rotor;
a plurality of pump blades of a selected pump blade axial height disposed on the first face of the rotor at a pump blade radial position on the rotor first face that is distinct from a turbine blade radial position on the rotor first face; and
a rotor housing including bearing surfaces for supporting rotation of the rotor, including turbine inlet and turbine outlet ports and pump inlet and pump outlet ports, and including pump and turbine fluid sealing surfaces.

2. The turbopump of claim 1 further comprising a plurality of turbine guide vanes supported by the housing at a radial periphery of the rotor first face.

3. The turbopump of claim 1 wherein a turbopump axial height including rotor bearings, the turbine blade axial height, the pump blade axial height, and the axial rotor height, is less than the rotor diameter.

4. The turbopump of claim 1 wherein a turbopump axial height including rotor bearings, the turbine blade axial height, the pump blade axial height, and the axial rotor height, is less than about 1000 microns.

5. The turbopump of claim 1 wherein the rotor diameter is less than about 15 millimeters.

6. The turbopump of claim 1 wherein the housing further includes injectors for injecting a hydrostatic thrust bearing fluid at a location between the rotor and the housing.

7. The turbopump of claim 1 wherein the rotor includes an aft thrust bearing pad characterized by an axial height for cooperation with the housing to operate as an aft thrust bearing.

8. The turbopump of claim 1 wherein bearing surfaces of the housing comprise hydrodynamic thrust bearing surfaces.

9. The turbopump of claim 1 wherein the housing further includes at least one pressure balance plenum connected for delivery of a pressure balance fluid between a face of the rotor and the housing.

10. The turbopump of claim 1 wherein a radial journal bearing of the rotor is defined by a clearance between a radially peripheral edge of the rotor and a corresponding housing wall.

11. The turbopump of claim 10 wherein the radial journal bearing comprises a gas journal bearing.

12. The turbopump of claim 1 wherein a radial journal bearing of the rotor is defined by a clearance between a radially central edge of the rotor and a corresponding central housing shaft about which the rotor is journalled for rotation.

13. The turbopump of claim 1 wherein the rotor, the turbine blades, and the pump blades each comprise a microfabricated element having radial dimensions that are photolithographically defined.

14. The turbopump of claim 13 wherein the rotor, the turbine blades, and the pump blades each comprise single crystal silicon.

15. The turbopump of claim 13 wherein the rotor, the turbine blades, and the pump blades each comprise silicon carbide.

16. The turbopump of claim 13 wherein the rotor, the turbine blades, and the pump blades each comprise silicon nitride.

17. A turbopump comprising:
a rotor having a first face and a second face and being characterized by a rotor axial height between the first and second rotor faces and by a rotor diameter;
a plurality of turbine blades of a selected turbine blade axial height disposed on the first face of the rotor;
a plurality of pump blades of a selected pump blade axial height disposed on the first face of the rotor;
a rotor housing including bearing surfaces for supporting rotation of the rotor, including turbine inlet and turbine outlet ports and pump inlet and pump outlet ports, and including pump and turbine fluid sealing surfaces; and
an annular fluid sealing surface disposed on the first face of the rotor and located radially between the turbine blades and the pump blades to cooperate with a corresponding housing sealing surface.

18. A turbopump comprising:
a rotor having a first face and a second face and being characterized by a rotor axial height between the first and second rotor faces and by a rotor diameter;
a plurality of radial-flow turbine blades together of a common turbine blade axial height and each of a constant axial height along blade radial extent, disposed on a first face of the rotor;
a plurality of radial-flow pump blades of a common pump blade axial height and each of a constant axial height along blade radial extent, disposed on the first face of the rotor; and
a rotor housing including bearing surfaces for supporting rotation of the rotor, including turbine inlet and turbine outlet ports and pump inlet and pump outlet ports, and including pump and turbine fluid sealing surfaces.

19. The turbopump of claim 18 wherein the plurality of turbine blades and the plurality of pump blades are all of a common axial height.

20. The turbopump of claim 19 wherein the plurality of turbine blades are radially tapered in a plane of the first rotor face to define turbine flow paths, and wherein the plurality of pump blades are radially tapered in a plane of the first rotor face to define pump flow paths.

21. The turbopump of claim 19 further comprising an annular seal of a seal axial height that is common with the turbine blade axial height and the pump blade axial height, and disposed on the first face of the rotor radially between the turbine blades and the pump blades.

22. A turbopump comprising:
a rotor having a first face and a second face and being characterized by a rotor axial height between the first and second rotor faces and by a rotor diameter;
a plurality of turbine blades of a selected turbine blade axial height disposed on the first face of the rotor in a circumferential arrangement defining a radial inflow turbine;
a plurality of pump blades of a selected pump blade axial height disposed on the first face of the rotor; and
a rotor housing including bearing surfaces for supporting rotation of the rotor, including turbine inlet and turbine outlet ports and pump inlet and pump outlet ports, and including pump and turbine fluid sealing surfaces.

23. A turbopump comprising:
a rotor having a first face and a second face and being characterized by a rotor axial height between the first and second rotor faces and by a rotor diameter;
a plurality of turbine blades of a selected turbine blade axial height disposed on the first face of the rotor;

a plurality of pump blades of a selected pump blade axial height disposed on the first face of the rotor radially inward of the turbine blades and in a circumferential arrangement defining a radial outflow pump; and a rotor housing including bearing surfaces for supporting rotation of the rotor, including turbine inlet and turbine outlet ports and pump inlet and pump outlet ports, and including pump and turbine fluid sealing surfaces.

24. A turbopump comprising:

a rotor having a first face and a second face and being characterized by a rotor axial height between the first and second rotor faces and by a rotor diameter;

a plurality of turbine blades of a selected turbine blade axial height disposed on the first face of the rotor;

a plurality of pump blades of a selected pump blade axial height disposed on the first face of the rotor;

a rotor housing including bearing surfaces for supporting rotation of the rotor, including turbine inlet and turbine outlet ports and pump inlet and pump outlet ports, and including pump and turbine fluid sealing surfaces; and a plurality of turbine guide vanes supported by the housing at a radial periphery of the rotor first face, the turbine guide vanes comprising radial-flow vanes together of a common axial height with the plurality of turbine blades and each of a constant axial height along vane radial extent.

25. A turbopump comprising:

An axially untapered rotor having a first face and a second face and being characterized by a rotor axial height between the first and second rotor faces and by a rotor diameter;

a plurality of turbine blades of a selected turbine blade axial height disposed on the first face of the rotor;

a plurality of pump blades of a selected pump blade axial height disposed on the first face of the rotor; and a rotor housing including bearing surfaces for supporting rotation of the rotor, including turbine inlet and turbine outlet ports and pump inlet and pump outlet ports, and including pump and turbine fluid sealing surfaces.

26. The turbopump of claim 25 wherein the rotor comprises a planar disk.

27. A turbopump comprising:

a rotor having a first face and a second face and being characterized by a rotor axial height between the first and second rotor faces and by a rotor diameter;

a plurality of turbine blades of a selected turbine blade axial height disposed on the first face of the rotor;

a plurality of pump blades of a selected pump blade axial height disposed on the first face of the rotor;

a rotor housing including bearing surfaces for supporting rotation of the rotor, including turbine inlet and turbine outlet ports and pump inlet and pump outlet ports, and including pump and turbine fluid sealing surfaces; and an annular fluid sealing surface disposed on the first face of the rotor and located between the turbine blades and pump blades to cooperate with a corresponding housing sealing surface, the annular seal being characterized by an axial height for cooperation with the housing to operate as a forward thrust bearing.

28. A turbopump comprising:

a rotor having a first face and a second face and being characterized by a rotor axial height between the first and second rotor faces and by a rotor diameter;

a plurality of turbine blades of a selected turbine blade axial height disposed on a face of the rotor;

a plurality of pump blades of a selected pump blade axial height disposed on a face of the rotor; and a rotor housing including bearing surfaces for supporting rotation of the rotor, including turbine inlet and turbine outlet ports that are isolated from pump inlet and pump outlet ports, and including pump and turbine fluid sealing surfaces, a turbopump axial height including rotor bearings, the turbine blade axial height, the pump blade axial height, and the rotor axial height, being less than the rotor diameter.

29. The turbopump of claim 28 wherein the turbine blades are disposed on a face of the rotor in a circumferential arrangement defining a radial inflow turbine.

30. The turbopump of claim 28 wherein the pump blades are disposed on a face of the rotor in a circumferential arrangement defining a radial outflow pump.

31. The turbopump of claim 28 further comprising a plurality of turbine guide vanes supported by the housing at a radial periphery of the rotor.

32. The turbopump of claim 28 further comprises a plurality of pump diffuser vanes supported by the housing at a radial periphery of the rotor.

33. The turbopump of claim 28 wherein the rotor is untapered.

34. The turbopump of claim 28 wherein the rotor comprises a planar disk.

35. The turbopump of claim 28 wherein a combined axial turbopump height including rotor bearings, the turbine blade axial height, the pump blade axial height, and the axial rotor height, is less than about 1000 microns.

36. The turbopump of claim 28 wherein the rotor diameter is less than about 15 millimeters.

37. The turbopump of claim 28 wherein the housing further includes injectors for injecting a hydrostatic thrust bearing fluid at a location between the rotor and the housing.

38. The turbopump of claim 28 wherein the rotor includes a thrust bearing pad characterized by an axial height for cooperation with the housing to operate as a turbopump thrust bearing.

39. The turbopump of claim 28 wherein bearing surfaces of the housing comprise hydrodynamic thrust bearing surfaces.

40. The turbopump of claim 28 wherein the housing further includes at least one pressure balance plenum connected for delivery of a pressure balance fluid between a face of the rotor and the housing.

41. The turbopump of claim 28 wherein a radial journal bearing of the rotor is defined by a clearance between a radially peripheral edge of the rotor and a corresponding housing wall.

42. The turbopump of claim 41 wherein the radial journal bearing comprises a gas journal bearing.

43. The turbopump of claim 28 wherein a radial journal bearing of the rotor is defined by a clearance between a radially central edge of the rotor and a corresponding central housing shaft about which the rotor is journalled for rotation.

44. The turbopump of claim 28 wherein the rotor, the turbine blades, and the pump blades each comprise a microfabricated element having radial dimensions that are photolithographically defined.

45. The turbopump of claim 44 wherein the rotor, the turbine blades, and the pump blades each comprise single crystal silicon.

46. The turbopump of claim 44 wherein the rotor, the turbine blades, and the pump blades each comprise silicon carbide.

47. The turbopump of claim 44 wherein the rotor, the turbine blades, and the pump blades each comprise silicon nitride.

* * * * *